UNITED STATES PATENT OFFICE.

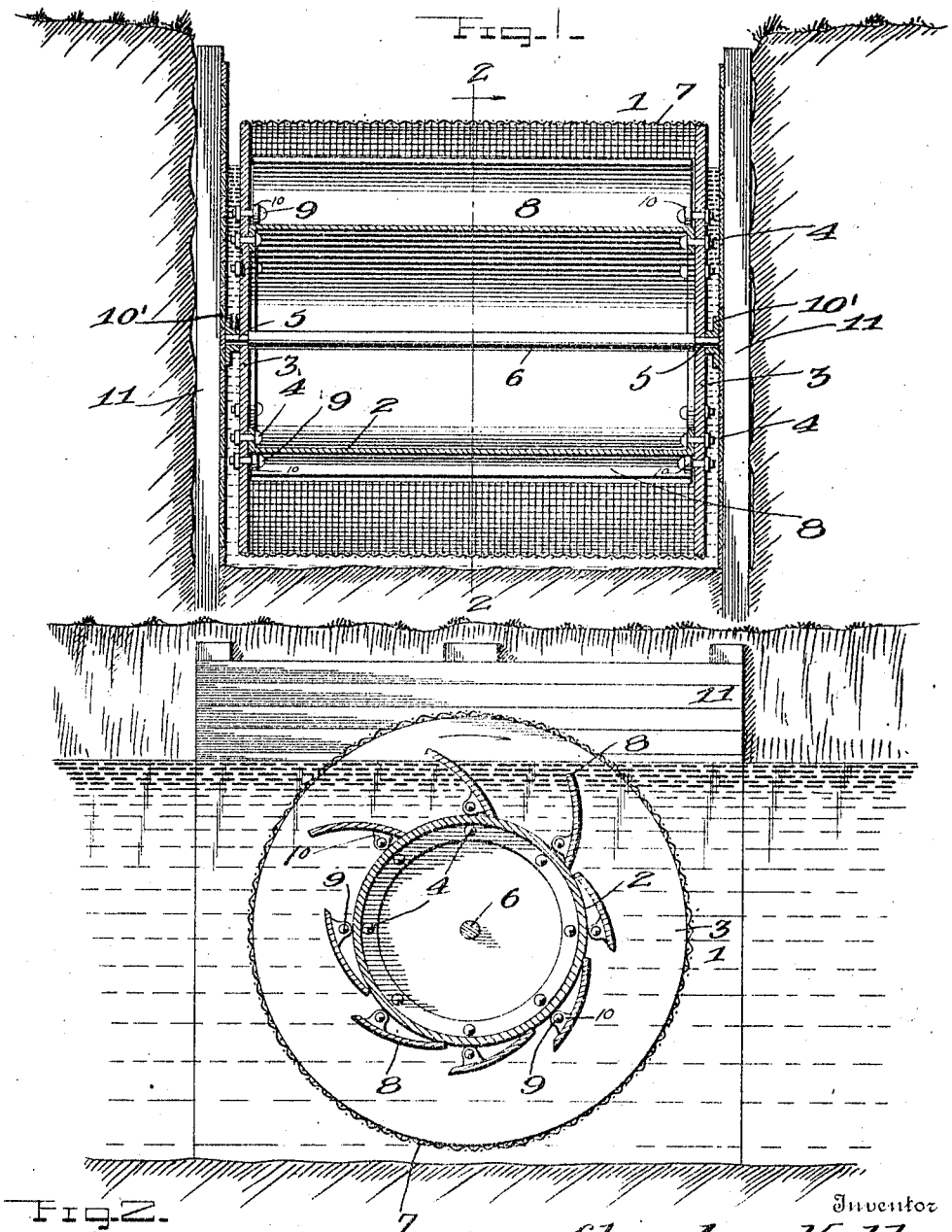

CHARLES KELL, OF GOLD HILL, OREGON.

FISH-DAM.

993,074.

Specification of Letters Patent.   Patented May 23, 1911.

Application filed April 26, 1910.   Serial No. 557,640.

*To all whom it may concern:*

Be it known that I, CHARLES KELL, a citizen of the United States, residing at Gold Hill, in the county of Jackson and State of Oregon, have invented certain new and useful Improvements in Fish-Dams, of which the following is a specification.

My invention has relation to improvements in fish dams and the main objects thereof are to produce a device of this character that will be simple in construction, durable and efficient in operation, and inexpensive to manufacture and install.

A further object of my device is to provide a novel manner of constructing the dam so that trash or debris may freely pass down stream but at the same time the dam will act as a preventive to the passage of fish thereby.

A further object of the device is to provide a novel construction of paddles to cause the rotation of the dam and a novel means of securing the paddles in position to rotate the dam.

With the foregoing and other objects in view my invention consists of the novel construction and arrangement of parts as are described in this specification, illustrated in the accompanying drawings forming a part thereof and particularly pointed out in the appended claims.

Referring to the drawings: Figure 1 is a vertical, transverse section of the device, looking down stream. Fig. 2 is a vertical section thereof taken on the line 2—2 of Fig. 1.

Referring more particularly to the drawings, in which like characters designate like parts throughout, my invention, in detail, is described as follows:

The dam 1 is provided with a drum or cylindrical portion 2, to each end of which is secured a metallic disk 3, by nut and bolt connections 4, aided by means of flanges, one of which flanges is formed integral with each end of the drum 2. Passing through a central perforation in each disk is a reduced portion 5 of the spindle or shaft 6, upon which the dam 1 is rotatably mounted. A wire gauze or screen 7 is suspended from the periphery of one disk to that of the other, the said screen picking up the trash and carrying it down stream.

A plurality of paddles 8 of slightly curved design are pivotally mounted at the periphery of the drum and between the disks 3, by means of suitable connecting means 9, one passing through a perforation in each of the ears 10 of each paddle and a corresponding perforation in the adjacent disk. Said ears are so arranged upon the inner face of each paddle that the paddles will receive the force of the water in the stream only when the water strikes the inner face thereof as said paddles are passing in their highest positions in the course of the rotation of the dam. (See Fig. 2).

Referring again to the shaft 6 it will be stated that said shaft is mounted for rotation in the bearings 10' of the uprights 11.

It is thought that the object and construction of the uprights is so clear that they need no further description.

Although I have specifically described my invention yet I may exercise the right to make such changes therein as do not depart from the spirit of my invention or the scope of the appended claims.

Having described my invention what I claim as new, is:

1. A fish dam provided with a drum, a disk secured to each end of the drum, said drum mounted for rotation, and means consisting of a plurality of paddles for the rotation of the dam, said paddles being pivotally secured to the disks at the periphery of the drum.

2. A fish dam provided with a drum, a disk secured to each end of the drum, a screen secured to the periphery of the disks and suspended from one to the other, a shaft or spindle passing through the disks, centrally, said disks secured thereto, said shaft mounted in a suitable manner for rotation, and means consisting of a plurality of paddles for the rotation of the dam, said paddles being pivotally secured to the disks at the periphery of the drum.

In testimony whereof I affix my signature, in presence of two witnesses.

CHARLES KELL.

Witnesses:
 R. L. DARLING,
 H. D. REED.